March 21, 1972     E. W. BENNETT     3,651,117
ESTERIFICATION OF HALOSILANES

Filed Sept. 8, 1970     2 Sheets-Sheet 1

FIG. I.

INVENTOR
EVERETT W. BENNETT
BY
ATTORNEY

INVENTOR
EVERETT W. BENNETT

United States Patent Office 3,651,117
Patented Mar. 21, 1972

3,651,117
ESTERIFICATION OF HALOSILANES
Everett W. Bennett, Longmeadow, Mass., assignor to Union Carbide Corporation, New York, N.Y.
Filed Sept. 8, 1970, Ser. No. 70,053
Int. Cl. C07f 7/04, 7/06, 7/18
U.S. Cl. 260—448.8 R
15 Claims

ABSTRACT OF THE DISCLOSURE

A process for esterifying halosilanes which comprises mixing a halosilane and a sufficient amount of an alcohol in a reaction zone wherein at least 80 percent of the halogen groups of the halosilane are esterified by reaction with said alcohol, said reaction zone having a temperature sufficiently high enough to maintain said halosilane, alcohol, and the highest boiling esterified silane reaction product in the vapor state, and removing the products of the reaction from the reaction zone while in the vapor state.

---

This invention relates to the conversion of chlorosilanes to silane esters. More particularly, this invention is directed to a vapor phase process for esterifying a halosilane. In addition, this invention is concerned with a continuous process for effecting esterification of halosilanes.

Present commercial methods of esterifying halosilanes involve the liquid phase intermixture of the halosilane and the alcohol. The reaction is characterized by the following equation:

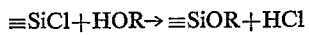

It is typical practice to employ an excess of alcohol in the reaction. However, as the reaction proceeds with consequent build up of HCl (or other hydrohalide, e.g., HBr and HF), more and more HCl becomes dissolved in the alcohol, and hence, more difficult to remove. As a result, sufficient HCl develops to counterbalance the equilibrium in favor of the ester, thereby affecting the yields of ester obtainable. The presence of HCl complicates the problem when the silane contains groups which can be attacked by HCl. For example, when converting trichlorosilane (HSiCl₃) to trimethoxysilane

by liquid phase reaction with methanol, HCl attacks the Si—H bond and a substantial amount of tetramethylsilicate (Si(OCH₃)₄) is produced. Because many organofunctional groups bonded to Si through an organo group are susceptible to premature reaction during liquid phase esterification of the Si—Cl groups, silanes containing such groups are made from esterified silanes rather than from halosilanes. For example, though gamma-isocyanatopropyltrichlorosilane can be made by reaction of allyl isocyanate with trichlorosilane, it cannot be efficiently converted to the corresponding alkoxy silane such as gamma-isocyanatopropyltrimethoxysilane because the isocyanato group reacts with the liquid alcohol to form the carbamate. In fact, the rate of reaction of the alcohol with the isocyanato group appears to be greater than its rate of reaction with the silylchloride group. This requires catalytic decomposition of the carbamate to form the isocyanate. In the case of beta-cyanoethyltrichlorosilane, its liquid phase esterification results in undesirable hydrolysis of the cyano group.

There is described by Weisner, Chem. Prumyl, vol. 11, pages 461–466 (1961), C.A., 56,496(1962) a method of reacting 1 mole of SiCl₄ and/or its partial CH₃O esters with 0.4–0.55 mole of methanol or ethanol in a jet at 10–15° C. above boiling point of the alcohol. The article suggests that the kinetics of the reaction proceeds in an orderly, $k_1$, $k_2$, $k_3$, $k_4$ manner, to provide first, monoesters; secondly, diesters; thirdly, triesters; and fourthly, tetraesters. When the reaction was simulated in a hot tube at 75–80° C. (as shown in Example 1, infra) using CH₃SiCl₃ and a stoichiometric molar concentration of methanol, the specificity of the reaction cited in the article did not occur. This suggests that Weisner's approach requires less than stoichiometric quantities of reactants with consequent low yield when the reaction is based on SiCl₄ reacted to desired product. Moreover, if the conditions of Weisner are adhered to, and other silanes are substituted for SiCl₄ and its partial esters, the esterified product can have a boiling point more than 10–15° C. above the boiling point of the alcohol, and therefore, the products of the reaction are captured in the liquid state with consequent build-up of HCl therein. The HCl attacks the alkoxide to form the chloride, thereby reducing the yield of desired product.

A most unique discovery was made when trichlorosilane and certain reactive organofunctional halosilanes were reacted with alcohols in the vapor phase at a temperature above the boiling point of the highest boiling end product of the reaction. It was found that a contradiction resulted to the expectation that as one increases the temperature of reaction, the rate of reaction increases. That can be explained in the following manner:

As stated above, the esterification reaction of a chlorosilane creates two products, the silyl ester (≡SiOR) and HCl. The HCl is known to react with the silyl ester, to provide the reverse reaction

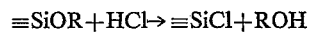

and react with the silyl hydride (≡SiH) to form silylchloride (≡SiCl). Reaction with HCl would be expected to increase on increasing the temperature at which the ester resides with the HCl by-product. Most surprisingly, it has been discovered that when the products of reaction, HSi(OR)₃ or mixtures of HSi(OR)₃, HSiCl(OR)₂, HSiCl₂(OR) and HSiCl₃, along with HCl, reside in the vapor state, very insignificant, if any, reaction occurs with the HCl. In fact, the only reaction which is significantly noted occurs in a later occurring liquid state after most of the HCl had been removed and a residual quantity was entrapped in the silyl ester products.

As pointed out previously isocyanato substituted silanes rapidly react through the isocyanato group wtih alcohols to form carbamates. It has been discovered that when isocyanato substituted organo halosilanes are reacted with alcohols while in the vapor state, and at a temperature above the boiling point (determined at the pressure of reaction zone) of the reaction product possessing the highest boiling point, very little, if any, carbamate is formed and essentially all of the reacted alcohol forms silyl ester, i.e., enters into the condensation reaction but not the carbamate-forming addition reaction.

In fact, the same preference can be noted when the chlorosilane contains organofunctionality as cyano, chloro, carboalkoxy, and mercapto, where one would expect either reaction of alcohol with the organofunctional group or HCl with the silyl ester product, particularly when the temperature at which there is intermixture between the potential reactants is above the boiling point of the highest boiling reaction product.

Thus, there is described herein a process for esterifying any halosilane which avoids many of the difficulties heretofore associated with their esterification. An added benefit of the process is that it can be run batch-wise, intermittently but continually, or it can be run as a continuous process which allows greater productivity with possibly less equipment than the known liquid phase process (which is only carried out batch-wise).

The process of this invention involves reacting vapors of a halosilane with vapors of an alcohol in a reaction zone maintained at a temperature which is sufficiently high to maintain the resulting esterified product in the vapor state, in other words, at a temperature above the boiling point of the highest boiling end product of the reaction. The amount of alcohol employed should be sufficient to effect at least about 80% esterification of the halogen groups bonded directly to the silicon atom of the silane. Any lesser degree of esterification would result in poor yields of silane ester and an uneconomically larger portion of silyl halide. The resulting esterified silane vapors are thereafter cooled to a temperature whereby the esterified silane is precipitated, i.e., condensed, to its normal physical state for use, such as solid or liquid.

It is desirable to avoid precipitation of the esterified silane product during the vapor phase reaction. If the esterified product is precipitated during the reaction, a relatively incomplete reaction is obtainable because of hydrogen halide attack of the esterified product and this causes formation of a mixture of silane halide-ester products. Only by keeping the esterified product in the vapor state until reaction is complete is it possible to insure maximum esterification of the reactive halogen groups bonded directly to Si in accordance with the stoichiometry of the reaction.

The process can be effected by continually feeding the halosilane and the alcohol in proper molar proportions to a heated reaction zone where intermixture is effected and withdrawing from the heated reaction zone the resulting esterified product. The esterified product is readily obtained by cooling the effluent from the reaction zone below the boiling point of the esterified product causing it to condense to either the liquid or solid state. The hydrohalide formed by the reaction should be kept in vapor state to assist its ready separation from the esterified product. Thus, during the recovery of the esterified product it is most desirable to maintain the temperature of the recovery zone above the condensation temperature of the hydrogen halide formed in the reaction zone but below that of the esterified product. To insure improved yields and to avoid any residual amounts of hydrogen halide contaminating the resulting esterified product, the esterified product can be recovered in a solvent or the recovered esterified product can be continually purged with an inert gas to force the removal of hydrogen halide capture by the precipitating esterified product or the esterified product can be treated with a hydrogen halide acceptor.

The temperature of the reaction zone is not narrowly critical. As indicated previously, its temperature should exceed the boiling point of the resulting esterified silane which boiling point is determined at the temperature and pressure of the reaction zone. Thus the temperature of the reaction zone should be at least as high as the boiling point of the highest boiling esterified silane determined under the reaction zone conditions, preferably at least 5° C. greater than the boiling point of such esterified silane as determined under the reaction zone temperature and pressure conditions. In many instances, it will be desirable that the temperature of the reaction zone should be at least 10° C. greater than the boiling point temperature of such esterified silane. The maximum temperature of the reaction zone is also not narrowly critical. It should not be so high as to adversely effect the ability to produce the esterified silanes. Thus the temperature of the reaction zone should be below the decomposition temperature of the resulting silylester. Moreover, since the process produces hydrogen halide, one should give consideration to selecting a temperature at which hydrogen halide which is formed by the reaction does not attack the reactor in which the reaction is being effected. Of course, this problem can be averted by appropriate selection of materials of construction of the reactor in which the reaction zone exists. Thus if the reaction zone exists within a quartz tube, little difficulty exists at temperatures up to chlorinating temperatures of the walls of the quartz reactor. However, if the reactor is made of a metal, then it is desirable to run the reaction at a temperature wherein the metal is not corroded by the hydrogen halide. This problem is one of engineering design and is within the skill of the chemist and engineer. In most cases, it is desirable that the temperature of the reaction zone does not exceed by 100° C. the boiling point of the resulting highest boiling esterified silane.

The selection of the most desirable temperature range employable in the practice of this invention is, of course, dependent upon the particular halosilane and alcohol selected. Within the limits described previously, it is readily apparent that those skilled in esterification reactions and the manufacture of silane esters can, with routine evaluation, select the most preferred temperature for practicing the instant vapor phase process.

The vapor phase process may be carried out at a variety of pressures. Pressures ranging from sub-atmospheric to atmospheric to super-atmospheric may be employed. The exact pressure conditions will be dependent upon the boiling point of the reactants, the susceptibility of the reactants or the esterified product to decomposition at certain temperatures and pressures and the like considerations. For example, if the boiling point of the esterified product of reaction is inordinately high and its stability to decomposition is adversely affected when operating at atmospheric pressure, it will be desirable in such cases to run the process at less than atmospheric pressure. Pressures as low as 1 millimeter mercury and lower may be employed. On the other hand, reactants which are extremely volatile or susceptible to decomposition at processing temperatures employable at atmospheric pressure may be more desirably placed under super-atmospheric pressure to insure safe use of such raw materials. In most cases, atmospheric pressure will be found most desirable and common to employ.

The contact time of the reactants, to wit, the halosilane and the alcohol, is generally rather short. The contact time usually is dependent upon the rate of reactivity of the alcohol with the halosilane. Usually the contact time need not exceed about 40 seconds. In most cases the contact time should be at least 0.1 second. A typical contact time of between about 1 to about 20 seconds will be most commonly employed.

The reaction may be effected in the presence of inert diluents. Illustrative inert diluent is any vaporous or gaseous material which does not enter into the reaction nor adversely affect the rate of reaction. The inert diluent may be any solvent for either the reactants, one of the reactants, or the silane ester end product. Illustrative of useable inert diluents include, by way of example, nitrogen gas, argon gas, helium gas, the hydrocarbon solvents such as mineral spirits, toluene, xylene, hexane, nonane, butane, and the like materials. The selection of an inert diluent is dependent upon the nature of the reactants employed, the temperature of the reaction, and the nature of the recovery of the product from the reaction. In some instances it may be desirable to add a base to the reaction. For example, it is sometimes desirable to include in the reaction mixture a base such as ammonia, tertiary amines, primary amines, secondary amines, and the like, for the purpose of sequestering the hydrogen halide by-product of the reaction. In some instances it is desirable to treat the recovered silane ester with bases or alkylene oxides to remove hydrogen halide by-product dissolved in the separated esterified product.

The removal of significant amounts of occluded hydrogen halide from the ester product is desirable in order to avoid decomposition of the ester. This can be accomplished in a number of ways such as, for example, condensing the ester product into a solvent under reflux conditions, condensing the ester product and bubbling an inert gas such as nitrogen through the liquid ester product to sparge hydrogen halide therefrom or to condense the ester product through a porous plate or packed porous bed in which it is countercurrently sparged with an inert gas and/or after which the ester product rains into a recovery zone which is also sparged with inert gas. Most desirable for such purposes is nitrogen gas. Argon and helium can also be employed for such purposes. A combination of any of the above techniques is eminently desirable in separating the last traces of hydrogen halide from the ester product. Another method for effecting removal of occluded hydrogen halide in the ester product is to pass the condensed ester product recovered from the reaction zone through an anionic exchange resin bed. The bed may be periodically cleansed by removing it and passing a base through it to separate the entrained halogen therein.

A further method for removing occluded hydrogen halide involves reacting the ester product with vicinal alkylene oxides such as ethylene oxide, 1,2-propylene oxide, 1,2-butylene oxide, 2,3-butylene oxide, epichlorohydrin, and the like. This treatment achieves two purposes. Firstly, it reacts with the hydrogen halide (HX) to add it to its structure:

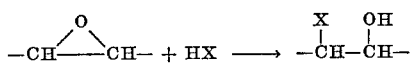

and, secondly, it reacts with residual silyl halide to form more silyl ester groups:

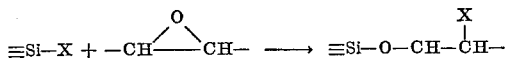

As is apparent from this discussion, a number of methods may be readily employed to separate the last traces of hydrogen halide from the silane ester product.

In all instances, it is most desirable to operate the complete process from introduction of the reactants to the final recovery of the silane ester product under anhydrous conditions to preclude hydrolysis of the silane ester. Thus the reactants, and diluents if employed, should be thoroughly dried if they contain water.

The process is particularly desirable in esterifying silanes of the formula (I)   $R'R''_nSiX_{3-n}$ wherein $n$ is 0 or 1, R' is one of hydrogen, cyanoalkyl wherein the alkyl group contains 2 to 8 sequential carbon atoms separating the cyano group from the Si, cyanoaryl wherein the cyano group is removed from the Si by at least 2 carbon atoms, cyanoalkaryl wherein the alkyl group contains at least one carbon atom and the aryl moiety contains no more than two aromatic rings, alkenyl, nitroaryl, halo substituted alkyl and aryl wherein the halo groups are chlorine and bromine, carboalkoxyalkyl wherein the alkyl group thereof contains at least two sequential carbon atoms separating the carboalkoxy group from the Si and the alkoxy group contains 1 to about 8 carbon atoms, alkenylcarbonyloxyalkyl wherein the alkyl contains 1 or at least 3 carbon atoms in sequence separating the carbonyloxy moiety from the Si, isocyanatoalkyl wherein the alkyl group contains at least 3 sequential carbon atoms separating the isocyanato group from the Si and mercaptoalkyl wherein the alkyl group thereof contains at least two sequential carbon atoms separating the mercapto group from the Si; R'' is one of the groups defining R' or alkyl of 1 to 20 carbon atoms or aryl; and X is halogen such as chlorine, fluorine and bromine.

Illustrative of R', defined above, are the following, such as, hydrogen; beta-cyanoethyl, gamma-cyanopropyl, delta-cyanobutyl, gamma - cyanoisobutyl, 8-cyanooctyl, and the like; vinyl, allyl, 5-pentenyl, 12-dodecenyl, oleyl, and the like; 4-nitrophenyl, 5-nitronaphthyl, and the like; chloromethyl, bromomethyl, gamma-chloropropyl, delta-chlorobutyl, 4-chlorophenyl, 2,4-dichlorophenyl, perchlorophenyl and the like; carboethoxyethyl, gamma-carbomethoxypropyl and the like; gamma-methacryloxypropyl, gamma-acryloxypropyl, gamma-sorbyloxypropyl, delta-methacryloxybutyl, gamma - methacryloxyisobutyl, and the like; gamma-isocyanatopropyl, delta-isocyanatobutyl, 11-isocyanatoundecyl, and the like; beta-mercaptoethyl, gamma-mercaptopropyl, delta - mercaptobutyl, gamma-mercaptoisobutyl and the like. Illustrative of R'', defined above, are the groups defining R' and alkyl and aryl such as methyl, ethyl, amyl, octadecyl, and the like, and phenyl, naphthyl, anthracyl, biphenyl, and the like.

The process is not limited to the use of any particular alcohol. Any alcohol which under the conditions of the reaction is capable of effecting esterification in the vapor state, as stated herein, is suitable. Generally speaking, the process is most desirably effected with aliphatic alcohols. Particularly desirable are the alkanols and the alkylene oxide mono-ols. Illustrative of suitable aliphatic alcohols include, by way of example only, methanol, ethanol, n-propanol, isopropanol, n-butanol, isobutanol, tertiary butyl alcohol, n-pentanol, isopentanol, n-hexanol, 2-ethyl-n-hexanol, the monomethyl ether of ethylene glycol, the monoethyl ether of ethylene glycol, the mono-n-propyl ether of ethylene glycol, the monomethyl ether of diethylene glycol, the mono-ethyl ether of diethylene glycol, the monomethyl ether of triethylene glycol, and the like alcohols. The only limitations imposed in the selection of an alcohol for reaction in the vapor state with the silicon halide vapor are the practical considerations of the boiling point of the alcohol, that it should also contain only one hydroxyl group bonded directly to carbon, and that it should be devoid of other groups which are capable of interfering with the reaction. Therefore, for most effective utilization of this process, the alcohol should contain only carbon, hydrogen and oxygen, only one hydroxyl group and that hydroxyl group should be bonded only to a non-carboxyl containing carbon atom, and any other oxygen in the alcohol (which is not part of the hydroxyl group) should be an ether group or part of an oxide or ester structure. Most desirable are the alkanols, i.e., alkyl-mono-ols, such as methanol, ethanol, n-propanol, isopropanol, n-butanol, and the like; and the ether-mono-ols such as methoxyethanol, ethoxyethanol, ethoxyethoxyethanol, methoxyethoxyethanol, and the like. It is to be appreciated that these requirements are not to be construed as restricting the scope of the process hereinabove described but only to designate practical limitations for the general application of this vapor phase process. There are many other alcohols which obviously can be used in the practice of this process, but in most cases such alcohols would be limited to laboratory evaluations of the process rather than be directed to commercial exploitations.

In order to give a more effective description of the process and its practical utilization, recourse is made to the drawings which depict apparatus for continually practicing the process.

Figure 1:
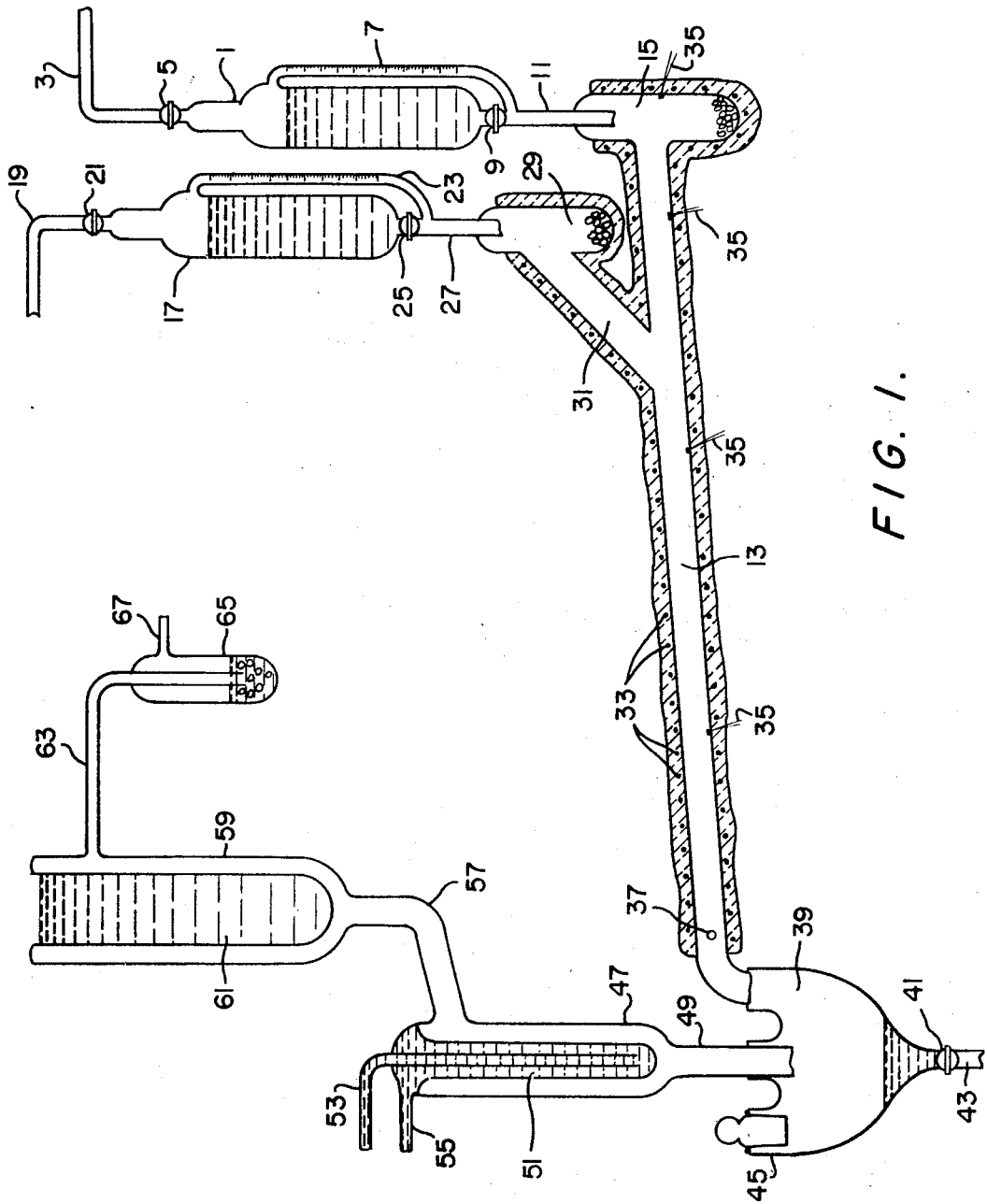
FIG. 1 is a cross-sectional representation of apparatus for carrying out the vapor phase esterification process.

With respect to FIG. 1, the reaction is carried out in hot tube 13. Hot tube 13 can be made of any material of construction which is not reactive with either the reactants or the product or by-products of the reaction. Most desirably, for laboratory operation, the hot tube is made of quartz or Pyrex glass. Hot tube 13 is brought to temperature by heating coils 33 covered with insulation. The temperature of the tube is measured by thermal couples 35.

Section 31 is a preheated tube for bringing the halosilane up to or close to the reaction temperature. The alcohol is introduced to dropping funnel 1 which contains an inert gas inlet 3 controlled by stopcock 5. The inert gas introduced through inlet 3 serves to maintain pressure on the alcohol in dropping funnel 7 and thereby regulate its flow through hot tube 13. Dropping funnel 1 contains burette 7 for measuring the rate of flow of alcohol to the hot tube.

Dropping funnel 17 is the repository for the halosilane and inert gas is fed through inlet 19 past stopcock 21 to maintain gas pressure on the halosilane and regulate its flow through hot tube 13. Dropping funnel 17 is provided with burette 23.

The alcohol is released from dropping funnel 1 by turning stopcock 9 so that it flows through capillary flow regulator tube 11 into holding zone 15 wherein it is brought to a vaporous state and passed into hot tube 13. Simultaneously, the halosilane is released from dropping funnel 17 by turning stopcock 25 and it flows through capillary flow regulator tube 27 into holding zone 29 wherein it is brought to a vaporous state. It is then passed through preheater tube 31 and introduced into hot tube 13 in admixture with the alcohol vapors. The reaction is effected in hot tube 13 and the hot vapors constituting the esterified halosilane and hydrogen halide by-products are fed into receiver 39. Located at approximately the terminus of hot tube 13 is rubber septum 37 from which hot samples of the vapor from the reaction can be taken out by a hypodermic needle into a hot receiver tube. Such samples can thereby be rapidly analyzed by vapor phase chromatography to determine the course of the reaction. In fact, such analysis provides accurate information of the course of the reaction absent competitive side-reactions. The vapors which are passed into receiver 39 are cooled sufficiently to separate the esterified silane which deposits at the bottom thereof and is removable by turning stopcock 41. The product is passed out through exit 43. As depicted in FIG. 1, receiver 39 is a 3-neck receiver vessel wherein one of the openings 45 is stopped. In the middle opening is fitted condenser 47 openly connected to receiver 39 by tube 49. Condenser 47 is operated by feeding cold water through inlet 53 into counterflow section 51 whereby the water is removed through exit 55. Cooled hydrogen halide gas is thereafter passed into tube 57 wherein it is removed into Dry Ice-trichloroethylene condenser 59. Condenser 59 contains an opened inner section 61 into which is fed trichloroethylene and Dry Ice to keep the temperature sufficiently low to effectively reduce the temperature of the hydrogen halide gas which is removed therefrom through tube 63 into a bubbler 65 and thence through tube 67 into an area for waste removal. The apparatus of FIG. 1 can be continually operated by continually feeding in halosilane to dropping funnel 17 and alcohol to dropping funnel 1. Continuous removal of esterified product can be effected from receiver 39 with consequent continual separation of HCl through the condensing system.

Figure 2:
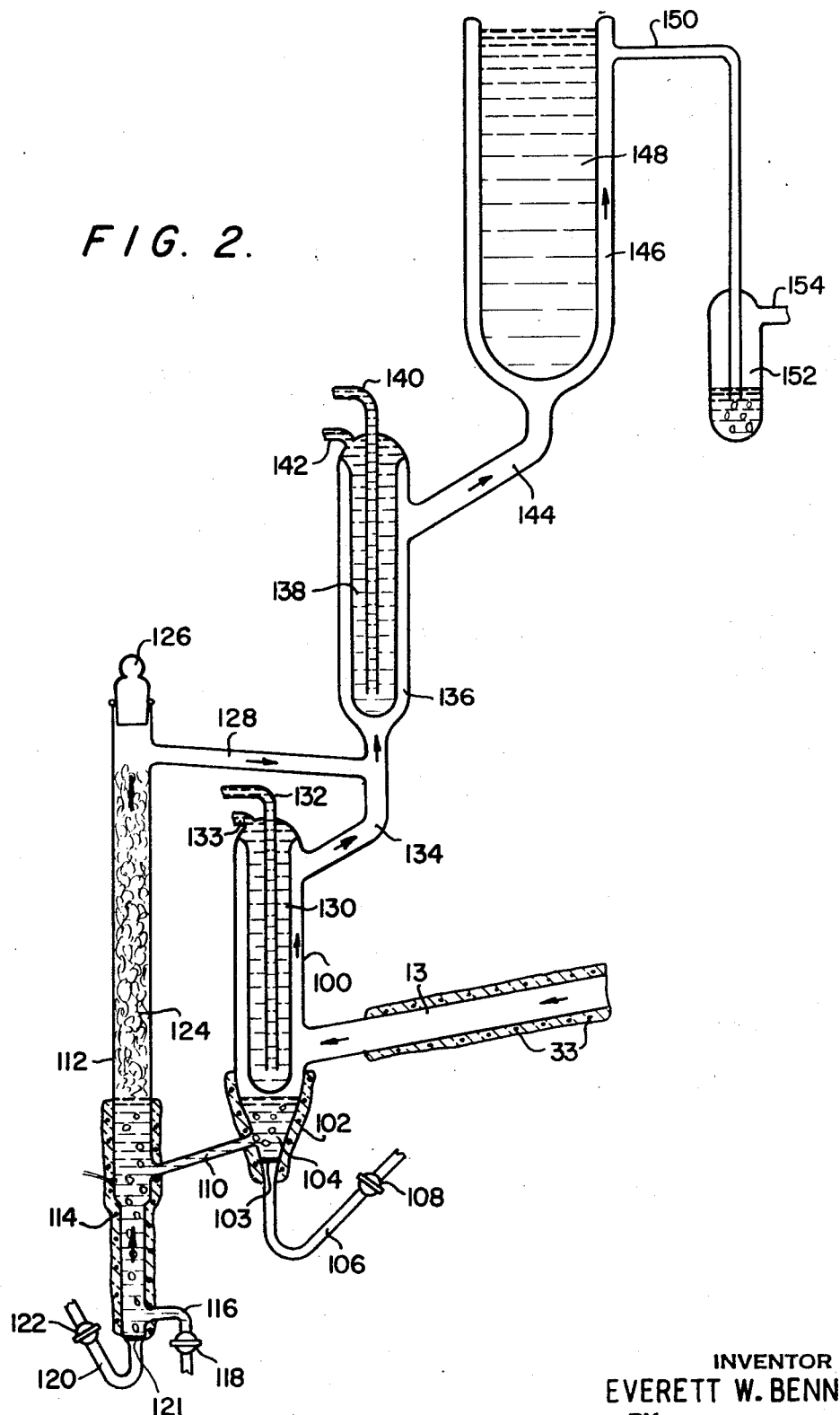
FIG. 2 is a cross-sectional view of a section of a vapor phase esterification apparatus, depicting an inert gas sparging apparatus for separation of hydrogen halide formed in the vapor phase reaction.

With respect to FIG. 2, there is shown another type of recovery system for removal of by-product hydrogen halide vapors and recovery of esterified silane. The front end of the reactor comprising the dropping funnels for the reactants is not shown. However, all of the assembly of the reactor leading reactants into hot tube 13 is the same as shown in FIG. 1. For convenience and brevity, such assembly has not been duplicated in FIG. 2. The reactants are removed from hot tube 13 into condenser 100. Condenser 100 comprises an esterified product sparge section 104 heated by electric heater 102 covered with insulation. It also comprises a glass filter disc 103 through which inert gas fed through tube 106 can be passed. Control of the introduction of the inert gas is effected by stopcock 108. In the upper section of condenser 100 is an internal cooling system comprising inlet tube 132, counterflow section 130 and exit tube 133. The hot hydrohalide gas is removed therefrom through tube 134 for introduction to condenser 136. Product recovered in section 104 is passed through tube 110 into a sparging section 112. It comprises a heated zone 114, protected by insulation, a product withdrawal exit 116, controlled by stopcock 118, and an inert gas inlet tube 120, controlled by stopcock 122. The gas is passed through glass filter disc 121 and bubbled counter-currently to the flow of esterified product in section 112. The gas is passed upward into glass helix column 112 containing glass packing 124. The top of the column is stopped by stopper 126. Inert gas containing hydrogen halide is removed through connecting tube 128 to be combined with the gases removed from tube 134. The combined gases are fed into condenser 136 fitted with internal coolant systems comprising tube 140 for introduction of liquid coolant with counter-current flow removal 138 at exit section 142. The cooled gases are then fed through tube 144 into and about condenser 146 comprising a Dry Ice-trichloroethylene condenser pot 148. The cooled gases are thereafter recovered from condenser 146 through tube 150 into bubbler 152 wherein the gas is exited through 154 to a waste recovery zone.

Although this invention has been described with reference to a plurality of details thereof, it is not intended that such should act to limit the scope of this invention. The following examples serve to only illustrate the practice of this invention and are not intended for the purposes of limiting the scope of this invention.

EXAMPLE 1

This experiment is designed to simulate the experimental conditions on the vapor phase esterification of chlorosilane with alcohol as described by Weisner, Chem. Prumyl, vol. 11, pages 461–466 (1961), by a 1:1 molar reaction of $MeSiCl_3$ with MeOH to give $MeCl_2SiOMe$.

The apparatus employed is depicted in FIG. 1. Into the dropping funnels were placed 500 milliliters of methyltrichlorosilane and 500 milliliters of methanol. A pressure head of nitrogen was applied to the dropping funnels to control the flow rate of $MeSiCl_3$ to 6.85 milliliters/min. (58.4 millimoles/min.) and of $CH_3OH$ to 2.36 milliliters/min. (58.4 millimoles/min.) in molar ratio of 1:1. The hot tube had an inside diameter of ¾ inch and was 30 inches long. The temperature of the hot tube was set at 75°–85° C., or 10° to 15° C. above the boiling point of methanol, as taught by Weisner. Samples of the reaction vapor mixture were withdrawn at the septum 37 FIG. 1 with a syringe heated to 85° C. Each vapor sample was immediately analyzed by vapor phase chromatography. Results of the analysis showed the presence of 43.9% of unreacted $MeSiCl_3$, 32.1% of the expected monoester, $MeCl_2SiOMe$ and 22.0% of the diester $MeClSi(OMe)_2$. The same reaction was repeated under identical experimental conditions except that the hot tube temperature was set at 140° C. and the syringe was at the same temperature. Analysis of the reaction vapor mixture by vapor phase chromatography showed the presence of 44.2% unreacted $MeSiCl_3$, 40.2% of the expected monoester, $MeCl_2SiOMe$, and 15.6% of the diester, $MeClSi(OMe)_2$.

"Me" as employed herein means Methyl ($CH_3$—).

EXAMPLE 2

The apparatus employed is depicted in FIG. 1, but reference is not made to each of the numerical designations. Into the dropping funnels are placed 550 milliliters of trichlorosilane and 550 milliliters of methanol respectively. A pressure head of dry nitrogen was applied to the top of the dropping funnels to regulate and to adjust the flow of trichlorosilane to 3.0 milliliters per minute (29.5 gram millimoles per minute or 0.5 pound per hour) and of methanol to 3.6 milliliters per minute (88.6 gram millimoles per minute or 0.377 pound per hour) to provide a 1 to 3 molar ratio. The hot tube had an inside diameter of ¾ inch and was 30 inches long. It was maintained at a temperature of 120° C. The reaction was continued for approximately 30 minutes until the system came to a state of dynamic equilibrium. Then products were collected from the receiver into a 6 oz. bottle. At the same time, the volume readings on the dropping funnel containing trichlorosilane was recorded. After 1 hour and 40 minutes, a total of 354 grams of product was collected while 305 milliliters (408 grams or 3.01 gram moles) of trichlorosilane had been fed to the hot tube. The colorless product recovered was placed in a 500 milliliters 3-necked flask equipped with a thermometer, a magnetic stirrer, and 18 inches long distillation column (packed with ⅛ inch glass helices) topped with a distillation head and a glass stopper. Propylene oxide was placed in a 50 milliliters burette and added slowly into the contents. A drop of the liquid was withdrawn and tested with a wet pH paper. Propylene oxide was added 0.5 milliliter at a time until the contents were completely neutral. A total of 19 milliliters of propylene oxide was used. The neutralized reaction mixture was distilled at atmospheric pressure under dry nitrogen. The following fractions were collected:

Fraction 1—boiling point 60-72° C., weighed 8 grams; vapor phase chromatographic analysis showed 14% $HSi(OCH_3)_3$ (about 3 grams) and 86% methanol present.

Fraction 2—boiling point 72-87° C., constant boiling point at 83° C., weighed 266 grams; vapor phase chromatographic analysis showed 98% trimethoxysilane.

Fraction 3—boiling point above 87° C., weighed 47.7 grams; vapor phase chromatographic analysis showed 37% trimethoxysilane (about 15 grams) and 63% tetramethylsilicate (32.7 grams).

EXAMPLE 3

The vapor phase reaction of trichlorosilane with ethylene glycol monomethylether was carried out in an apparatus as depicted in FIG. 1. A condenser plus nitrogen sparging system, depicted in FIG. 2, was used to replace receiver 39 depicted in FIG. 1. The apparatus depicted in FIG. 2 consisted of a combination of condensers and nitrogen sparges designed to remove HCl from the liquid product condensed from the reaction vapor coming out of the hot tube 13, FIG. 1. Condenser 100 is heated with hot paraffin oil to 90° C. through a circulating pump (not shown) connected to inlet 132 and outlet 133. Most of the reaction vapor mixture was condensed at receiver 104, heated with a jacket 102 to 80° C. Dissolved HCl in the liquid product was sparged with dry nitrogen from inlet tube 108 through a filter disc 103. The liquid was drained through a small tube 110 into another receiver 114 where it was sparged again with dry nitrogen from inlet tube 120 through a filter disc 121. Vapor mixture carried away by nitrogen was passed through column 112 packed with glass helix 124. The mixture flowed through connecting tube 128 to a water-cooled condenser 136. Low boiling material that escaped condenser 136 was condensed by a Dry-Ice condenser 146 cooled with a mixture of Dry-Ice and trichloroethylene 148. HCl was not condensed but disposed off through bubbler 152 and into the hood. Liquid products could be drawn out continuously through tubing 116 and stopcock 118.

Into the two dropping funnels was placed 500 milliliters of $HSiCl_3$ and 500 milliliters of $CH_3OCH_2CH_2OH$ respectively. A pressure head of nitrogen was applied to the dropping funnels to adjust the flow rate of $HSiCl_3$ to 1.80 milliliters/min. (17.7 millimoles/min.) and of $CH_3OCH_2CH_2OH$ to 4.32 milliliters/min. (54.9 millimoles/min.) in 1:3.1 molar ratio. The hot tube had an inside diameter of ¾ inch and was 30 inches long. The hot tube was maintained at 230° C. Sample of the reaction vapor mixture was withdrawn with a syringe heated to 230° C. through septum 37, FIG. 1. The vapor sample was immediately analyzed by vapor phase chromatography. Results of the analysis showed high yield of the completely esterified product, $HSi(OC_2H_4OCH_3)_3$, 95.4%. Only a very small amount of $Si(OC_2H_4OCH_3)_4$, 1.5% was present. In contrast to the liquid phase reaction, there was little reaction of the SiH bond with HCl present in the vapor state.

The reaction was run for 1 hour and 20 minutes. A total of 377 g. product was collected through stopcock 118 while 192 g. (1.42 moles) of $HSiCl_3$ and 334 g. (4.44 moles) of $CH_3OCH_2CH_2OH$ were charged. The colorless product recovered was placed in a 500 ml. 3-necked flask equipped with a thermometer, a magnetic stirrer and 18 inches long distillation column (packed with ⅛ inch glass helix) topped with a distillation head and a glass stopper. The contents were neutralized with 5 milliliters propylene oxide to neutral pH. Fractional distillation of the products yield:

Fraction 1—boiling point 30°/8 mm. to 120°/6 mm., weighed 14 grams; vapor phase chromatography analysis showed the presence of $CH_3OCH_2CH_2OH$.

Fraction 2—boiling point 121°/5 mm., weighed 333 grams; vapor phase chromatographic analysis showed 93% $HSi(OC_2H_4OCH_3)_3$.

Fraction 3—heavies, weighed 29 g. The yield of $HSi(OC_2H_4OCH_3)_3$ was 86% based on the number of moles of $HSiCl_3$ used.

EXAMPLE 4

Similarly, as shown in Example 3, the vapor phase reaction of $HSiCl_3$ and $CH_3CH_2OH$ also gives high yield of the completely esterified product, $HSi(OC_2H_5)_3$. Into the two dropping funnels are placed 500 milliliters $HSiCl_3$ and 500 milliliters of ethanol respectively. The two reagents were added at rate of 1.76 milliliters/min. (17.3 millimoles/min.) of $HSiCl_3$ and of 3.12 milliliters/min. (53.9 millimoles/min.) of $C_2H_5OH$. The hot tube temperature was 180° C. Vapor phase chromatographic analysis of the reaction vapor mixture showed high yield, 91%, of the completely esterified ester, $HSi(OC_2H_5)_3$. Small amount of $Si(OC_2H_5)_4$, 8.3% was also present.

EXAMPLE 5

The vapor phase reaction of trichlorosilane with n-butyl alcohol was carried out in the same way as in Example 3, using the same apparatus. Into the two dropping funnels were placed 500 milliliters of $HSiCl_3$ and 500 milliliters of $n-C_4H_9OH$ respectively. A pressure head of nitrogen was applied to adjust the flow of $HSiCl_3$ to 1.60 milliliters/min. (15.8 millimoles/min. and of $N-C_4H_9OH$ to 4.37 milliliters/min (47.7 millimimoles/min.) in 1:3.0 molar ratio. The hot tube temperature was set at 220° C. The reaction vapor mixture was analyzed by vapor phase chromatography. Results of the analysis showed high yield of the completely esterified product, $HSi(OBu)_3$ in 96%; and $Si(OBu)_4$ in 0.8% yield.

EXAMPLE 6

The vapor phase reaction of trichlorosilane and isopropyl alcohol was carried out in the same way as described in Example 3. Into the two dropping funnels were placed 500 milliliters of $HSiCl_3$ and 500 milliliters of isopropyl alcohol respectively. A pressure head of nitrogen was applied to adjust the flow rate of $HSiCl_3$ to 1.10 milliliters/min (10.9 millimoles/min.) and of $(CH_3)_2CHOH$ to 2.55 milliliters/min. (33.4 millimoles/min.) in 1:3.1 molar ratio. The hot tube temperature was maintained at 200° C. Analysis of the reaction vapor mixture showed the presence of 95% $HSi(OC_3H_7)_3$ and 1.2% $Si(OC_3H_7)_4$.

EXAMPLE 7

The vapor phase reaction of β-cyanoethyltrichlorosilane with ethanol is carried out in apparatus depicted in FIG. 1. Into the two dropping funnels are placed 500 milliliters of β-cyanoethyltrichlorosilane and 500 milliliters of ethanol respectively. The hot tube had an inside diameter of ¾ inch and was 30 inches long. The tube 13, FIG. 1, was heated with an electric heater 33. The hot tube temperature was measured with thermocouples 35 located at the wall of the tube. Dry nitrogen gas was applied through inlet tube 19 and 3 through stopcock 21 and 5 to dropping funnels 17 and 1. NCCH₂CH₂SiCl₃ in dropping funnel 17 was forced through stopcock 25 into a flowmeter 17 and then into preheater 29 where it was vaporized. The vapor was heated at side arm 31 to close to the hot tube temperature. The preheater was six inches long. A graduated side arm 23 was used to measure the flowrate of NCCH₂CH₂SiCl₃ charged. This was carried out by closing stopcock 25 and by timing the rate of liquid dispensed in the graduated side arm 23. The flow rate of C₂H₅OH in dropping funnel 1 was measured in the same way. The flow rate of NCCH₂CH₂SiCl₃ was adjusted to 2.64 milliliters/min. (18.5 millimoles/min.) and C₂H₅OH to 3.48 milliliters/min. (59.5 millimoles/min.) in a molar ratio of 1:3.2. The hot tube was maintained at 250° C. Vapor samples of the reaction mixture were withdrawn at septum 37, FIG. 1, with a syringe heated to 250° C. and immediately analyzed by vapor phase chromatography. The reaction vapor mixture was partially condensed in receiver 39. Uncondensed vapor was cooled and condensed with a water condenser 51 followed by a Dry-Ice/ trichloroethylene condenser 59. HCl was not condensed but was disposed of through 63 and bubbler 65 into the hood.

Results of the vapor phase chromatography on the reaction vapor mixture showed the presence of 5.6% (mole percent) of NCCH₂CH₂SiCl(OC₂H₅)₂, 84% of the completely esterified product NCCH₂CH₂Si(OC₂H₅)₃. Analysis showed very little reaction between the sensitive cyano group and the HCl present.

EXAMPLE 8

The vapor phase reaction of vinyltrichlorosilane with n-propyl alcohol is carried out in apparatus depicted in FIG. 1. Vinyltrichlorosilane, 500 milliliters, and n-propyl alcohol, 500 milliliters, were placed in the two dropping funnels. The flow rates of these two reagents were adjusted to 1.22 milliliters/min. (9.55 millimoles/min.) ViSiCl₃ and 2.25 milliliters/min. (30.1 millimoles/min.) N-propyl alcohol in molar ratio of 1:3.1. The vapor was introduced into the hot tube maintained at 200° C. The hot tube had an inside diameter of ¾ inch and was 30 inches long. Reaction vapor mixture was withdrawn and analyzed by vapor phase chromatography. Results of the analysis showed high yield of the esterified products; 88% yield of ViSi[O(CH₂)₂CH₃]₃ and a small amount of ViClSi[OCH₂CH₂CH₃]₂, 6.1%. The analysis indicated that the vinyl group attached to Si was not effected by the presence of HCl. "Vi" means CH₂=CH—.

EXAMPLE 9

The vapor phase reaction of γ-isocyanatopropyl trichlorosilane with methanol was carried out in apparatus as depicted in FIG. 1. Into the two dropping funnels were placed 500 milliliters of γ-isocyanatopropyltrichlorosilane and 500 milliliters of methanol respectively. A pressure head of nitrogen was applied to the dropping funnels to adjust the flow of OCNCH₂CH₂CH₂SiCl₃ to 1.2 milliliters/min. (5.5 millimoles/min.) and of CH₃OH to 0.62 milliliter/min. (15.4 millimoles/min.) in molar ratio of 1:2.8. The hot tube had an inside diameter of ¾ inch and was 30 inches long. The hot tube was maintained at 230° C. Reaction vapor mixture was analyzed by vapor phase chromatography. Results of the analysis showed the following product formation in mole percent:

11.8%; (MeO)₃SiCH₂CH₂CH₂NCO, 78.5% and

($n=1$ and 2). The high yield of the completely esterified product, (MeO)₃SiCH₂CH₂CH₂NCO, proved that the sensitive isocyanate group was not significantly attacked by either HCl or MeOH. This discovery was in contrast to the same reaction in the liquid phase illustrated in the following example.

A sample of 1.2 milliliters of OCNCH₂CH₂CH₂SiCl₃ and 0.62 milliliter of CH₃OH in 1:2.8 molar ratio was rapidly mixed at room temperature (25° C.) in a small container. A rapid reaction occurred with evolution of HCl. After one minute of reaction, a sample of the reaction mixture was analyzed by vapor phase chromatography to give the following results:

30%, Cl(MeO)₂SiCH₂CH₂CH₂NCO; 28% (MeO)₃SiCH₂CH₂CH₂NCO and 37%, Clₙ(MeO)₃₋ₙSiCH₂CH₂CH₂HCOOMe ($n=1$ and 2).

In contrast to the vapor phase reaction of

with MeOH, the same reaction in the liquid state gave a poor yield of the completely esterified product,

with a large amount of carbamate,

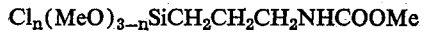

being formed at the same time.

EXAMPLE 10

The vapor phase reaction of phenyltrichlorosilane with ethanol is carried out in apparatus depicted in FIG. 1. Into the two dropping funnels were placed 500 milliliters of phenyltrichlorosilane and 500 milliliters of ethanol respectively. A nitrogen pressure head was applied to adjust the flow of PhSiCl₃ to 2.64 milliliters/min. (16.5 millimoles/min.) and of C₂H₅OH to 2.98 milliliters/min. (51.2 millimoles/min.) in 1:3.10 molar ratio. The hot tube had an inside diameter of ¾ inch and was 30 inches long. The hot tube was maintained at 240° C. Sample of the reaction vapor mixture was withdrawn with a syringe heated at 240° C. The vapor sample was immediately analyzed by vapor phase chromatography. Results of the analysis showed a high yield of the esterified silane products: 81%, PhSi(OC₂H₅)₃ and 12% PhClSi(OC₂H₅)₂.

Though, in the above description, the process has been emphasized as particularly desirable for esterifying halosilanes containing hydrogen or organo groups which are potentially reactive with hydrogen halide or alcohols, it is readily apparent that the same process can be most effectively employed for esterifying less reactive halosilanes, such as those of the formula:

(II) 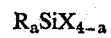

wherein R° is a monovalent hydrocarbyl such as alkyl, aryl, cycloalkyl, aralkyl and alkaryl; X is defined above; and $a$ has the value of 0 to 3, inclusive, preferably 1 to 3 inclusive. R° can be the alkyl or aryl defined above with respect to R"; cycloalkyl such as cyclohexyl, cyclobutyl, cyclooctyl and the like; aralky such as xylyl, tolyl, beta-phenylethyl, 8-phenyloctyl, and the like; and alkaryl such as 4-methylphenyl, 2,4-dimethylphenyl, 4-n-octylphenyl, and the like.

Illustrative of halosilanes suitable for use in the practice of this invention as encompassed by Formulae I and II above are, for example, methyltrichlorosilane,
methyltribromosilane,
methyltrifluorosilane,
dimethyldichlorosilane,
dimethyldibromosilane,
dimethyldifluorosilane,
trimethylchlorosilane,
trimethylbromosilane,
trimethylfluorosilane,
methyldichlorosilane,
dimethylchlorosilane [(CH₃)₂HSiCl],
methyldifluorosilane,
monochlorosilane,
dichlorosilane,
trichlorosilane, silicon tetrachloride,
difluorosilane,
tribromosilane,
diphenyldichlorosilane,
phenyltrichlorosilane,
phenylmethyldichlorosilane,
phenyldimethylmonochlorosilane,
cyclohexyltrichlorosilane,
tolyltrichlorosilane,
gamma-mercaptopropyltrichlorosilane,
beta-mercaptoethyltrichlorosilane,
gamma-mercaptobutyltrichlorosilane,
gamma-mercaptoisobutyltrichlorosilane,
beta-cyanoethyltrichlorosilane,
beta-cyanoethylmethyldichlorosilane,
beta-cyanoethyldimethylchlorosilane,
gamma-cyanopropyltrichlorosilane,
delta-cyanobutyltrichlorosilane,
4-cyanophenyltrichlorosilane,
4-cyanomethylphenyltrichlorosilane,
8-cyanooctyltrichlorosilane,
4-cyanophenylmethyldichlorosilane,
vinyltrichlorosilane,
vinylmethyldichlorosilane,
divinyldichlorosilane,
vinyltribromosilane,
vinyltrifluorosilane,
allyltrichlorosilane,
diallyldichlorosilane,
3-butenyltrichlorosilane,
chloromethyltrichlorosilane,
gamma-chloropropyltrichlorosilane,
gamma-chloroisobutyltrichlorosilane,
chloromethyldimethylmonochlorosilane,
p-chlorophenyltrichlorosilane,
2,4-dichlorophenyltrichlorosilane,
pentachlorophenyltrichlorosilane,
beta-carbomethoxyethyltrichlorosilane,
beta-carboethoxyethyltrichlorosilane,
gamma-carboethoxypropyltrichlorosilane,
delta-carbo-n-octyloxy-n-butyltrichlorosilane,
acryloxymethyltrichlorosilane,
gamma-acryloxypropyltrichlorosilane,
gamma-methacryloxypropyltrichlorosilane,
gamma-methacryloxypropylmethyldifluorosilane,
delta-methacryloxybutyltrichlorosilane,
gamma-isocyanatopropyltrichlorosilane,
gamma-isocyanatoisobutyltrichlorosilane,
gamma-isocyanatopropylmethyltrichlorosilane,
and the like.

What is claimed is:
1. A process for esterifying halosilanes which comprises mixing a halosilane and a sufficient amount of an alcohol in a reaction zone wherein at least 80 percent of the halogen groups of the halosilane are esterified by reaction with said alcohol, said reaction zone having a temperature sufficiently high enough to maintain said halosilane, alcohol, and the highest boiling esterified silane reaction product in the vapor state, and removing the products of the reaction from the reaction zone while in the vapor state.
2. The process of claim 1 wherein the alcohol is a mono-ol.
3. The process of claim 1 wherein the reaction zone temperature is at least about 5° C. greater than the boiling point of the highest boiling esterified silane reaction product.
4. The process of claim 3 wherein the reaction zone temperature is below the decomposition temperature of the esterified silane reaction product.
5. The process of claim 1 wherein the halosilane has the formula:

$$R'R''_nSiX_{3-n}$$

wherein $n$ is 0 or 1, R' is one of hydrogen, cyanoalkyl wherein the alkyl group contains 2 to 8 sequential carbon atoms separating the cyano group from the Si, cyanoaryl wherein the cyano group is removed from the Si by at least 2 carbon atoms, cyanoalkaryl wherein the alkyl group contains at least one carbon atom and the aryl moiety contains no more than two aromatic rings, alkenyl, nitroaryl, halo substituted alkyl and aryl wherein the halo groups are chlorine and bromine, carboalkoxyalkyl wherein the alkyl group thereof contains at least two sequential carbon atoms separating the carboalkoxy group from the Si and the alkoxy group contains 1 to about 8 carbon atoms, alkenylcarbonyloxyalkyl wherein the alkyl contains 1 or at least 3 carbon atoms in sequence separating the carbonyloxy moiety from the Si, isocyanatoalkyl wherein the alkyl group contains at least 3 sequential carbon atoms separating the isocyanato group from the Si and mercaptoalkyl wherein the alkyl group thereof contains at least two sequential carbon atoms separating the mercapto group from the Si; R'' is one of the groups defining R', alkyl of 1 to 20 carbon atoms or aryl; and X is chlorine, fluorine or bromine.
6. The process of claim 5 wherein the alcohol contains one alcoholic hydroxyl group.
7. The process of claim 6 wherein the halosilane is trichlorosilane.
8. The process of claim 6 wherein $n$ is 0, R' is cyanoalkyl and X is chlorine.
9. The process of claim 6 wherein $n$ is 0, R' is isocyanatoalkyl, and X is chlorine.
10. The process of claim 6 wherein $n$ is 0, R' is alkenyl carbonyloxyalkyl and X is chlorine.
11. The process of claim 6 wherein $n$ is 0, R' is mercaptoalkyl and X is chlorine.
12. The process of claim 6 wherein $n$ is 0, R' is alkenyl and X is chlorine.
13. The process of claim 6 wherein $n$ is 0, R' is chloroalkyl and X is chlorine.
14. The process of claim 6 wherein $n$ is 0, R' is nitroaryl and X is chlorine.
15. The process of claim 6 wherein $n$ is 0, R' is cyanoaryl and X is chlorine.

References Cited
UNITED STATES PATENTS

| | | | |
|---|---|---|---|
| 2,469,725 | 5/1949 | Hunter | 260—448.8 R X |
| 2,473,260 | 6/1949 | Rochow | 260—448.8 R |
| 2,476,307 | 7/1949 | Klein et al. | 260—448.8 R |
| 2,553,845 | 5/1951 | Clark | 260—448.8 R |
| 2,658,908 | 11/1953 | Nitzsche et al. | 260—448.8 R X |
| 2,674,579 | 4/1954 | Morgan et al. | 260—448.8 R X |
| 3,320,297 | 5/1967 | Pino | 260—448.8 R |

OTHER REFERENCES

"Chemical Abstracts," 54, p. 496, 1962.

JAMES E. POER, Primary Examiner

P. F. SHAVER, Assistant Examiner

U.S. Cl. X.R.

260—448.8 A